March 25, 1930.  J. N. SAXTON  1,751,660

GREASE GUN

Filed Jan. 17, 1928    2 Sheets-Sheet 1

Inventor
John N. Saxton
Hull, Brock & West
Attorneys

March 25, 1930.  J. N. SAXTON  1,751,660
GREASE GUN
Filed Jan. 17, 1928   2 Sheets-Sheet 2
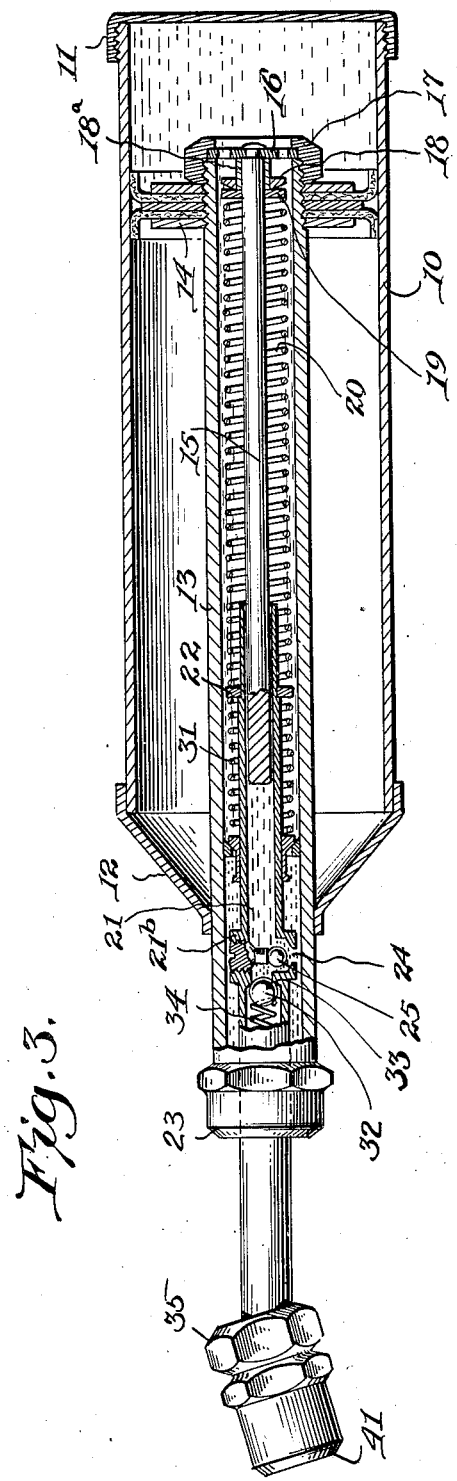
Inventor
John N. Saxton
By Hull, Broch & West
Attorneys Patented Mar. 25, 1930

1,751,660

UNITED STATES PATENT OFFICE

JOHN NELSON SAXTON, OF BUCYRUS, OHIO, ASSIGNOR TO THE GREASE-RITE CORPORATION, OF CHICAGO, ILLINOIS, A CORPORATION OF ILLINOIS

GREASE GUN

Application filed January 17, 1928. Serial No. 247,429.

This invention relates generally to a super force feed lubricator in the nature of a grease gun for the purpose of supplying lubricant of any consistency and which is capable of use in connection with any type of lubricant receiving tip nozzle or fitting.

Another object of the invention is to provide a grease gun from which the lubricant can be delivered under great pressure and a still further and very important object is to provide a grease gun which will overcome air pockets in the lubricant.

Another advantageous feature is the clutch grip at the nozzle or delivery end of the device capable of being brought into positive and sealed engagement with any of the well known types of tips or fittings now in common use.

Grease guns have been in common use for some time but so far as I am aware no grease gun has been provided which operates equally as well with all consistencies of lubricant and at the same time overcomes air pockets. The overcoming of air pockets is a very important feature, inasmuch as these air pockets prevent the uniform and even delivery of the lubricant and the operator is entirely ignorant of this failure unless the lubrication is taking place at such a point that the exudation of the lubricant is visible.

These objectionable features of the present type of grease gun are entirely overcome by my improved grease gun.

With the various objects in view hereinbefore recited, my invention consists in the novel features of construction and in the manner of combining and arranging the same, all of which will be fully described hereinafter and set forth in the appended claims.

Figure 1:
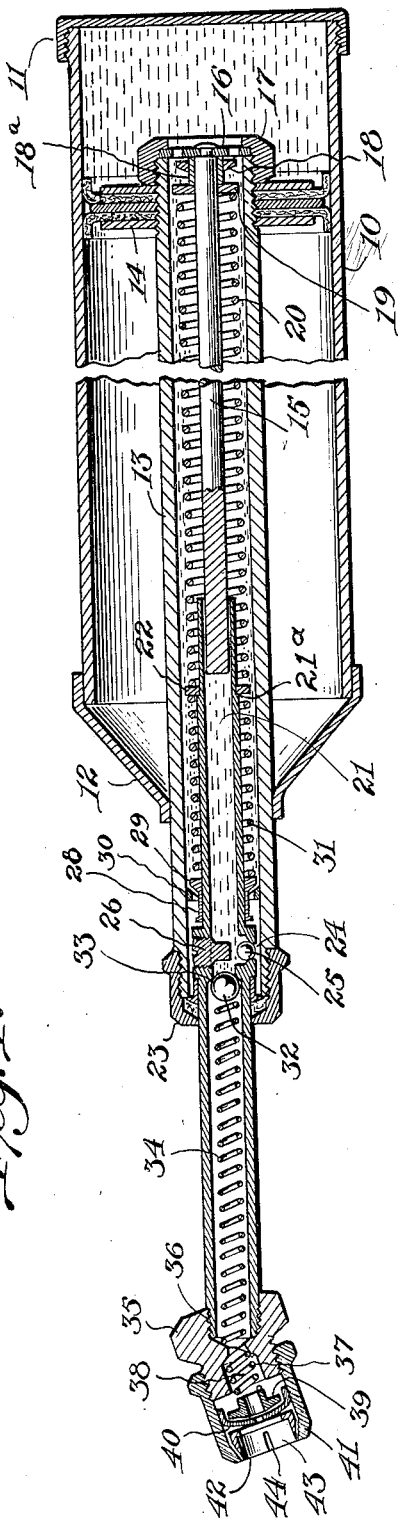
Figure 2:
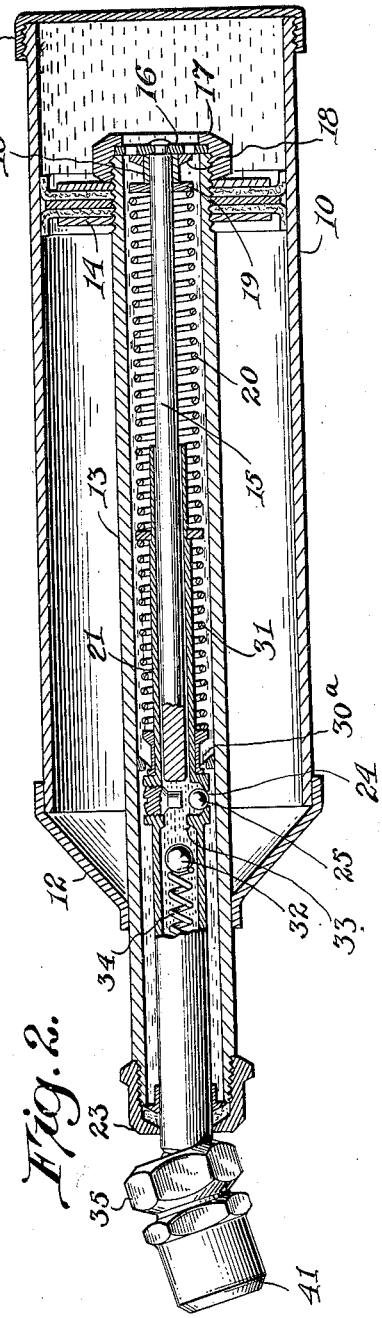

In the drawings forming a part of this specification Fig. 1 is a longitudinal sectional view of a grease gun embodying one form of my invention, the gun being ready for use; Fig. 2 is a similar view showing the position the various parts assume when the gun is being pushed forward to force the lubricant out; Fig. 3 is a view showing the position the parts assume during the return movement; Fig. 4 is an enlarged sectional view of the sliding valve and Fig. 5 is an end view of the same.

In the practical embodiment of my invention, I employ a cylindrical container 10 which may be designated the "low pressure cylinder", and into which the lubricant is first introduced at the rear, which rear end is normally closed by means of the cap 11. The forward end of the low pressure cylinder 10 is provided with the tapering portion 12 through which passes the intermediate cylinder 13 carrying a piston 14 at its rear end, this piston being provided with the usual leather washers for engagement with the interior sides of the cylindrical container 10. Within the cylinder 13 there is arranged a rod 15 which carries at its rear end a perforated disk 16 fitting against the end of the cylinder 13 and held in place by means of a threaded ring 17. A valve 18 is mounted on a bushing $18^a$ upon the rod 15 in advance of the apertured disk and this valve has its forward face slightly tapered. It is also of such a size as to work freely within the cylinder 13 and permit the passage of lubricant through the perforated disk into the intermediate cylinder. It also never completely closes the perforations in the disk 16, as will be more fully explained hereinafter.

A washer 19 is arranged upon the rod 15 in advance of the valve 18 and a coil spring 20 is arranged within the intermediate cylinder 13, surrounding the rod 15, bears against the washer 19.

The forward end of the rod 15 fits into the rear or inner end of the high pressure cylinder or tube 21. A washer 22 is freely movable upon this high pressure cylinder or tube 21 and the forward end of the coil spring 20 abuts against this second washer 22. This washer 22 is limited in its forward movement by a shoulder $21^a$ upon the cylinder 21 near its inner end. The high pressure cylinder or tube 21 extends forwardly beyond the forward end of the intermediate cylinder 13, and a gasket 23 limits the forward movement of this high pressure cylinder or tube. This high pressure cylinder is enlarged upon the exterior as shown at $21^b$ and it is this enlargement which prevents its withdrawal through the gasket 23. This enlargement 21ᵇ also provides ample space for a lateral opening 24 in which is seated a ball valve 25. An opening 21ᶜ is made opposite for the introduction of the ball valve, and then this opening is closed by a screw plug 26 which prevents dislocation of the valve 25 while at the same time limiting its inward movement. Adjacent to the opening 24 and the ball valve 25, and sliding upon the high pressure cylinder 21 to the rear of the enlargement 21ᵇ is a sleeve 28 having flanged ends, the rear flange 29 being beveled, and carried by this sleeve 28 is a ring valve 30 having radial openings 30ᵃ at the center thereof for the passage of lubricant. The rear face of this valve is inclined to fit against the beveled flange 29.

A second coil spring 31 surrounds the high pressure cylinder 21 bearing at its rear end against the washer 22 and at its forward end against the flanged valve carrying sleeve 28. Adjacent to the ball valve 25 and screw plug 26 and within the high pressure cylinder is a second ball valve 32 normally held seated upon the seat 33 by means of a coil spring 34 located in the forward end of the high pressure cylinder, said spring being held in place and placed under tension by means of the body portion 35 of the discharge nozzle.

This body portion 35 has the threaded opening 36 produced at an angle to the longitudinal axis and into which the threaded forward end of the high pressure cylinder screws. This body portion 35 has a chamber 37 which communicates with the high pressure cylinder and receives the lubricant therefrom. This chamber 37 contains a coil spring 38 which bears upon a follower 39 having a central opening, this follower 39 fitting into a leather cup shaped disk 40 also having a central opening for the passage of lubricant. The follower 39 and disk 40 are carried within the tip 41 which is screwed to the body portion 35, and it will be noted that the inner edges of this tip are beveled or contracted as shown at 42. Fitting within the contracted end of the tip 42 is a nipple gripping clutch 43 in the form of a ring having tapering sides, these tapering sides being split longitudinally as shown at 44 to permit the contraction of the ring when relative movement between this ring and the tip 41 of a nozzle is had.

The various parts being assembled as herein shown and described, the operation of the device is as follows: The cap 11 at the rear end of the container or low pressure cylinder is removed and the open end of the container inserted in the lubricant. The intermediate cylinder 13 is then moved outwardly or forwardly, carrying with it the piston 14 and a vacuum being created at the end of this piston, the lubricant will be sucked up into the container or low pressure cylinder 10. The cap 11 is then replaced. Upon the rearward or inward movement of the piston 14, the lubricant is forced through the perforated disk past the valve 18 and into the intermediate cylinder 13. The lubricant passes along forwardly until it comes into contact with the flanged sleeve 28 and valve 30 carried by the high pressure cylinder 21. The high pressure cylinder 21 is then pushed inwardly compressing the spring 20 and closing the valve 18. The high pressure cylinder is then permitted to return and in doing so the ball valve 25 becomes unseated and valve 32 seated.

The sleeve 28 with valve 30 moves back and lubricant flows past the ball valve 25 into the high pressure cylinder in advance of the forward end of the piston rod 15, it being understood that the valve 30 has radial openings 30ᵃ and when unseated from flange 29 permits lubricant to pass through. The gun in its fully loaded condition so far as high pressure and intermediate pressure cylinders are concerned is shown in Fig. 1.

When it is desired to work the gun to force lubricant to a bearing the tip 41 is placed upon the nipple so that the nipple clutch 43 receives the end of said nipple, and the container 10 is pushed forwardly.

It will be seen that the high pressure cylinder 21 has been now moved inward or rearward to the limit of its travel, expelling the grease through the forward end of the high pressure cylinder 21 into the nozzle 35 and there in turn into the fitting. At this point it will be noticed that as the high pressure cylinder 21 moves inward or rearward over the plunger 15 the lubricant due to a reduction in volume caused by the inward movement of the high pressure cylinder 21 and plunger 15 creates great pressure, which in turn causes the valve 25 to seat and the valve 32 to open. During this action the valve 30 is clear back against its flange 29 and the valve 18 has seated against the ported disk 16. It should be observed that the ports in disk 16 are never entirely closed by the valve 18; this is accomplished by making the diameter of the valve 18 smaller than the radius of the ports in disk 16. This acts as a by-pass for the variation of displacements caused by the inward or outward movement of the high pressure cylinder 21. In order to properly understand the action of the gun the fact should be kept in mind that there is always a difference in pressure between the lubricant in the low pressure cylinder 10 and the accumulated lubricant in the intermediate cylinder 13. It is the accumulated pressure in the intermediate cylinder 13 which has forced the valve 30 off its seat 29 against its stop, thus allowing the lubricant to pass through the ports 30ᵃ in valve 30, into the forward end of the intermediate cylinder 13 up to the packing gland 23 which prevents leakage, and this same accumulated pressure has forced the valve 18 to seat against a ported disk 16. Having now reached the limit of the forward travel of the low pressure cylinder 10, the check valve 32 closes by means of the spring 34. As the low pressure cylinder is forced backward by the tension of the spring 20 bearing against the washer 19 shouldered on the high pressure cylinder 21, the rear end of the spring 20 bears against the washer 22 which in turn holds the bushing 18ª in place and upon which the valve 18 slides. This backward movement now causes the high pressure plunger 15 to recede in the high pressure cylinder 21, thereby increasing the displacement or volume, thus creating a suction effect which causes check valve 25 to lift off its seat. The check valve 25 is acted upon by two forces, first, by the suction effect caused by the recession of the high pressure plunger 15, and, secondly, by the pressure of the lubricant itself being trapped in the front end of the intermediate cylinder 13 between the gland nut 23 and sleeve valve 28 which at this juncture has seated itself on the part 29. The pressure of the trapped lubricant causes the sliding valve 30 to move along the barrel of the high pressure cylinder 21 contracting the spring 31 which bears against the washer 22, the sliding valve thus compensating for any difference in displacement within the intermediate cylinder 13, in addition to this, the sliding valve upon returning to its normal position through the energy of the spring 31 will compress any air that may have been pocketed, to a reduced volume and forces it to the point of intake and then into the high pressure cylinder 21 and is carried forward together with the lubricant now under high pressure. The sliding valve 30 with its co-acting part 28—29 serves for two distinct purposes, first, it functions as a trap for confining the air at a point in the intermediate cylinder 13 where it can be successfully expelled along with the lubricant; secondly, it assists the loading of the high pressure cylinder 21 by acting virtually as a piston by pushing the lubricant through the aperture 24 through the energy of the previously contracted spring 31.

Referring to the ported disk 16 and its relating valve 18, it will be seen that if this valve was not provided with the by-pass means already described and which compensates for the change in the displacement between the points of the sliding valve 30 and the ported disk 16 the gun would virtually be inoperative due to the fact that any liquid is non-compressible. Putting it in simple words, we would be trying to compress a column of grease trapped at both ends.

The vital importance of these various valves cannot be overly emphasized; each functions for some particular duty upon which the ultimate success of this gun is dependent.

It should be noted that the gun contains three separate and distinct coiled springs and these springs function independently of each other.

It is obvious that when the gun is first loaded and entirely filled with the lubricant to be used, the piston 14 will be at the maximum forward end of the low pressure cylinder 10, and that as the lubricant is used the intermediate cylinder 13 upon which is mounted the piston 14 will move inward or rearward in proportion to the amount of the lubricant discharged. The lubricant passing through the forward portion of the high pressure cylinder enters the chamber 38 in the nozzle and tends to move the valve 39 into forceful engagement with the disk 40 which tends to spread the same and bring it into tight engagement with the interior of the tip 41 of the nozzle.

It will be understood that while these various operations have been taking place the tip of the nozzle has been brought into engagement with the lubricant receiving fitting, said fitting, indicated in dotted lines, being received in the fitting clutch 43 and the pressure of the valve 39 and disk 40 upon this clutch tends to force the clutch into engagement with the tapering portion of the nozzle tip and the ring portion of the clutch being slotted serves to contract the clutch firmly upon the fitting so that a tight joint is provided and the continued pressure of the lubricant from within forces the same through the valve, the apertured disk and through the clutch ring into the fitting.

In operation it is only necessary to place the nozzle with the clutch over the tip of the fitting and apply pressure by a slight forward movement of the container, this movement serving to force in both the high pressure cylinder and the intermediate cylinder, the high pressure cylinder working upon the stationary piston rod carried by the intermediate cylinder so that the necessary compounding of pressures is readily accomplished. By the employment of the two ball valves 25 and 32 in combination with the sliding sleeve and valve upon the high pressure cylinder within the intermediate cylinder and adjacent to the inlet ball valve 25, I completely eliminate the objectional effect of air pockets and maintain a uniform compact mass of lubricant which is forced through the high pressure cylinder at the proper pressure and then carried along into the high pressure cylinder for delivery.

It will thus be seen that I provide a simple and highly efficient construction of super pressure grease gun which can be used in connection with any of the well known types of fittings and in which any consistencies of lubricant may be employed.

Having thus described my invention, what I claim is:—

1. In a device of the kind described, a discharge nozzle carried at the forward end of a tubular member and having a contracted forward end, a contractible nipple gripping clutch movably mounted on said nozzle, and means operated by pressure developed in said tubular member during the operation of said device for forcing said clutch outwardly into engagement with the contracted end of the nozzle for contracting said clutch.

2. In a device of the kind described, a discharge nozzle comprising a body and a tip portion, the forward end of said tip portion being contracted, a spring pressed follower and disk within said nozzle and a contractible nipple gripping clutch arranged in the contracted end of said tip portion against which said disk is pressed for forcing the same into the contracted end of the tip portion.

3. In a device of the kind described, the combination with low, intermediate, and high pressure cylinders, and a piston rod in said high pressure cylinder having one end secured to said intermediate cylinder which cylinder telescopically receives one end of said high pressure cylinder, said high pressure cylinder having a discharge nozzle at its outer end and a spring pressed ball valve adjacent said end, a second ball valve located in a lateral opening in the high pressure cylinder communicating with the intermediate cylinder, a flanged sleeve movable on the high pressure cylinder and carrying a valve movable on said sleeve and slidably fitting in the intermediate cylinder, and springs within the intermediate cylinder to actuate said valve and to extend the piston and intermediate cylinder relative to the high pressure cylinder, said low pressure cylinder being secured to the intermediate cylinder with means providing communication therebetween.

4. In a device of the kind described, the combination with a container or low pressure cylinder, of an intermediate cylinder valved at its rear end and carrying a piston upon the exterior and a piston rod or plunger upon the interior, a high pressure cylinder movable in the intermediate cylinder and upon the piston rod, and carrying a discharge nozzle at its forward end, said high pressure cylinder having a ball valve therein, and also a lateral opening with a valve therein, a retarding valve movable upon the high pressure cylinder adjacent the lateral opening, and springs within the intermediate cylinder for forcing the high pressure cylinder outwardly relative to said piston and intermediate cylinder, and for forcing said retarding valve toward said lateral opening.

5. In a device of the kind described, the combination with the high, low and intermediate pressure cylinders, said high pressure cylinder having a discharge nozzle at its forward end, and having a lateral opening and a valve therein, a flanged sleeve movable upon the high pressure cylinder adjacent the valved opening and a valve movable upon said sleeve said intermediate pressure cylinder telescopically receiving said high pressure cylinder and said movable valve, and having a piston associated therewith for reciprocation in said high pressure cylinder, said low pressure cylinder being secured to said intermediate cylinder and in communication therewith.

6. In a device of the kind described, the combination with a container or low pressure cylinder, of an intermediate cylinder slidably received in the low pressure cylinder and having a piston at its rear end, a piston rod within said intermediate cylinder and carried thereby, and a third or high pressure cylinder slidably received in the intermediate cylinder and carrying a discharge nozzle at its forward end, said high pressure cylinder receiving the free end of the piston rod carried by the intermediate cylinder, said high pressure cylinder having a lateral opening and valve therein and also a second valve within the high pressure cylinder and adjacent the first mentioned valve, a spring in said intermediate cylinder for extending the high pressure cylinder relative to said piston and intermediate cylinder.

7. In a device of the kind described, the combination with a container, of a cylinder telescopically received therein, and a second cylinder telescopically received in the first named cylinder and carrying a delivery nozzle at its forward end, a piston secured in said first cylinder reciprocably received in the inner end of said second cylinder, said second cylinder having a plurality of valves, one of which permits the entry of lubricant into the said second cylinder from said first cylinder, and one of which permits the delivery of the lubricant to the nozzle from said second cylinder, and means for normally maintaining the first and second named cylinders in extended position.

8. In a device of the kind described, the combination with a container or low pressure cylinder, of an intermediate cylinder having a piston attached thereto, the rear end of said intermediate cylinder having a valve to permit the inflow of lubricant from said container, a piston rod arranged in said intermediate cylinder at its rear end, a high pressure cylinder reciprocably received in the intermediate cylinder and upon the piston rod, and having a discharge nozzle at its forward end, said high pressure cylinder having a lateral opening at a point within the intermediate cylinder, and a valve for closing the same, a movable retarding valve arranged upon the high pressure cylinder adjacent the lateral opening and slidably fitting the bore of said intermediate cylinder and yieldable means within the intermediate cylinder for extending the high pressure cylinder relative to said piston and intermediate cylinder, and for forcing said retarding valve toward said last mentioned opening in said high pressure cylinder for the purpose described.

9. In a device of the kind described, a container, a piston for said container, a cylinder slidably received in said container and connected to said piston, said cylinder being provided with an inlet valve, a hollow plunger reciprocably received in said cylinder and having inlet and outlet valves, a reciprocating piston for said plunger, and a valve movable upon said plunger within said cylinder for trapping the air within the cylinder preparatory to forcing the same through the inlet valve into the plunger and means normally forcing said movable valve toward said inlet.

10. In a device of the kind described, the combination with a nozzle and high pressure cylinder, of an intermediate cylinder in which the high pressure cylinder works, said high pressure cylinder having a lateral opening inlet valve, and also a spring pressed outlet valve, a container in which the intermediate cylinder moves, a piston for said container, means including a piston secured to said first-named piston for contracting the oil space within the high pressure cylinder as the same is moved inwardly and means for moving said high pressure cylinder outwardly.

11. In a device of the kind described, the combination with a nozzle and high pressure cylinder having inlet and outlet valves, of an intermediate cylinder in which said high pressure cylinder reciprocates, a valve member slidable upon said high pressure cylinder near the inlet valve and a spring acting upon said sliding valve member, a rod on which the high pressure cylinder moves to contract and enlarge the space for lubricant and a spring acting upon the high pressure cylinder to force the same forwardly.

12. In a device of the kind described, the combination with the high, low and intermediate cylinders, the intermediate cylinder carrying a piston which is slidably received in the low pressure cylinder and having a valve at its inner end which is partially open at all times permitting open communication between said low and intermediate cylinders, a rod carried by the intermediate cylinder and working in the inner end of the high pressure cylinder, said high pressure cylinder having an opening communicating with the intermediate chamber, and an outlet, a check valve in said opening and a check valve in said outlet, and a spring within the intermediate cylinder and acting upon the high pressure cylinder to move the same outwardly or forwardly.

13. In a device of the kind described, the combination with a container, of an intermediate cylinder carrying a piston slidably received in said container and having an inlet valve and also a rod, a high pressure cylinder reciprocably received within the intermediate cylinder and upon the said rod, said high pressure cylinder having a spring pressed outlet valve and a laterally movable inlet valve, and a spring pressing upon the high pressure cylinder to move the same outwardly.

14. In a device of the kind described, the combination with a high pressure cylinder carrying a discharge nozzle and a spring pressed outlet valve, and also a laterally movable inlet valve, of a sleeve slidable upon said cylinder and carrying a valve, a washer carried by said cylinder and engaging a shoulder thereon, an intermediate cylinder in which the high pressure cylinder reciprocates, a rod within this cylinder and on which the high pressure cylinder moves, and spring surrounding the high pressure cylinder upon opposite sides of the washer for extending the high pressure cylinder relative to said rod and intermediate cylinder, and for forcing said slidable sleeve and valve toward said inlet in said high pressure cylinder, and a container connected to said intermediate cylinder, and a piston received in and slidable relative to said container for forcing fluid adapted to be contained therein into said intermediate cylinder.

15. In a device of the kind described, the combination with a high pressure cylinder carrying a discharge nozzle, a spring pressed outlet valve and a laterally movable inlet valve, of a sleeve slidable upon said high pressure cylinder, and carrying a valve, a washer and a spring between said washer and sleeve, an intermediate cylinder having an inlet valve at its inner end telescopically receiving the end of said high pressure cylinder, a rod carried in said cylinder and working in the high pressure cylinder, a spring within the intermediate cylinder and compressed between the washer and the inlet valve at the inner end of said intermediate cylinder, said last mentioned spring normally holding the relatively telescoping parts in extended position, the first mentioned spring in cooperation with the last mentioned spring urging the slidable sleeve toward the inlet in said high pressure cylinder, a piston upon the exterior of the intermediate cylinder, and a container enveloping said piston and intermediate cylinder and slidably received thereon, from which fluid may be forced into said intermediate cylinder.

16. A lubricating device comprising a high pressure cylinder having a ball valve normally closing one end thereof, a piston received in the other end of said cylinder, a lateral opening in said cylinder between said valve and piston with a valve therein, an intermediate cylinder member slidably receiving said high pressure cylinder with its outer end having a fluid tight fit with said cylinder, said piston being secured to said intermediate cylinder for movement therewith, a low pressure cylinder slidably receiving the end of said intermediate cylinder, a piston head on said intermediate cylinder fitting said low pressure cylinder, a spring within the intermediate cylinder normally maintaining said high pressure cylinder in extended position with respect to said intermediate cylinder and said piston and a valve member slidable on said high pressure cylinder against which one end of said spring bears for forcing fluid into said high pressure cylinder when the piston moves outwardly on its suction stroke.

17. In a device of the class described, the combination of low, intermediate and high pressure cylinders telescopically received one within the other in the order named, there being slidable fluid tight joints between the high and intermediate pressure cylinders and between the intermediate and low pressure cylinders, a piston secured to the inner end of said intermediate cylinder and slidably received within said high pressure cylinder, a spring pressed valve in the outer end of said high pressure cylinder, said high pressure cylinder having a lateral opening communicating with said intermediate cylinder, a check valve in said opening, a sliding valve received on said high pressure cylinder and closely fitting in said intermediate cylinder and a spring having one end bearing on said sliding valve for extending the intermediate and high pressure cylinders relative to each other and for forcing the fluid from the intermediate into the high pressure cylinder.

18. In a high pressure grease gun, a low pressure cylinder, a piston for said cylinder, a nozzle, a hollow extensible and contractible connection between said piston and nozzle, a high pressure cylinder within said low pressure cylinder, a piston for said last-named cylinder and adapted to be forced into the same for discharging grease therefrom, and means for positively forcing lubricant into said high pressure cylinder during the return stroke of said last-named piston.

19. In a high pressure grease gun, a container, a piston in said container, a nozzle, a hollow expansible and contractible connection between said nozzle and piston, comprising a high pressure cylinder and a piston for said high pressure cylinder for discharging lubricant through said nozzle when said container is moved toward the same, and means independent of the pressure of the air for forcing lubricant into said high pressure cylinder when said receptacle is moved away from said nozzle.

20. In a pressure grease gun, a container, a piston therefor, a nozzle, a hollow expansible and contractible connection between said nozzle and piston comprising a high pressure cylinder and a piston therefor for discharging lubricant under pressure through said nozzle, an intake port for said cylinder, a discharge valve for said cylinder adjacent to said port, through which lubricant is forced from said high pressure cylinder through said nozzle when said container is moved in one direction, and means for positively forcing grease into said high pressure cylinder through said intake port when said container is moved in the opposite direction.

21. In a high pressure grease gun, a container, a piston in said container, a nozzle, a hollow expansible and contractible connection between said nozzle and piston, comprising a high pressure cylinder and a piston for said high pressure cylinder for discharging lubricant through said nozzle when said container is moved toward the same, intake and discharge ports for said high pressure cylinder, valves for said ports, the discharge valve being adjacent to the end of said second-named piston when the same is at the limit of its discharging movement, and means independent of the pressure of the air for forcing lubricant into said high pressure cylinder when said container is moved away from said nozzle.

In testimony whereof, I hereunto affix my signature.

JOHN NELSON SAXTON.